United States Patent [19]

Creehan et al.

[11] Patent Number: 5,501,867
[45] Date of Patent: Mar. 26, 1996

[54] COMPOSITION FOR SEASONING AND PREPARING FOOD ITEMS FOR GRILLING AND METHOD OF MAKING THE SAME

[76] Inventors: Timothy F. Creehan, P.O. Box 1504, Destin, Fla. 32540; Richard L. Creel, Jr., 734 Legon Dr. #17, Destin, Fla. 32541

[21] Appl. No.: 334,048

[22] Filed: Nov. 4, 1994

[51] Int. Cl.⁶ .................................. A23D 9/00; A23L 1/39
[52] U.S. Cl. ......................... 426/601; 426/605; 426/609; 426/650
[58] Field of Search .................................. 426/601, 605, 426/609, 650

[56] References Cited

U.S. PATENT DOCUMENTS

| | | | |
|---|---|---|---|
| 4,849,019 | 7/1989 | Yasukawa et al. | 426/609 |
| 5,374,434 | 12/1994 | Clapp et al. | 426/609 |

OTHER PUBLICATIONS

Ayala, 1985. Prairie Farmer Meat Cookbook, Wallace Homestead Book Co., Lombard, Illinois, p. 27.

*Primary Examiner*—Helen Pratt
*Attorney, Agent, or Firm*—George A. Bode; Daniel E. Maddux

[57] ABSTRACT

A composition suitable for use both as food preparation seasoning and non-stick base for cooking food items on a grill. The composition comprises an egg-based composition comprising egg yolk, distilled vinegar and soybean oil; a lemon juice comprising water, lemon juice concentrate, lemon oil and preservatives; a tomato paste comprising tomatoes, salt and citric acid; a salt-based composition comprising salt, yellow dyes, imitation butter flavor and preservatives; white vinegar; water; flavorings; a mustard-based composition comprising black mustard seeds, vinegar, white wine, salt and spices; paprika; and sugar. The composition is prepared by blending the above-listed ingredients at ambient temperature until they are all thoroughly blended. The composition is applied to food items prior to placing the food items on a grill for cooking. The composition can also be used as a marinating sauce on the food items.

9 Claims, No Drawings

COMPOSITION FOR SEASONING AND PREPARING FOOD ITEMS FOR GRILLING AND METHOD OF MAKING THE SAME

BACKGROUND OF THE INVENTION

1. Field of the Invention

The present invention relates in general to compositions of matter suitable for use as a seasoning and non-stick base for food items cooked on a grill.

2. Description of the Prior Art

Many people today cook food items on a grill. However, cooking food on a grill poses a problem: the food items tend to stick to the grill. Such sticking results in food loss due to parts of the food items sticking to the grill. Furthermore, such sticking requires the grill to be cleaned after each cooking session and makes such cleaning more difficult. Thus, a need exists for a composition of matter suitable for use in preparing food items for cooking on a grill such that the food items will not stick to the grill.

Non-sticking compositions presently exist. However, a non-sticking composition that does not adversely affect the taste of the grilled food items is desirable. Furthermore, a non-sticking composition of matter that is also suitable for use as a seasoning on food items cooked on a grill is desirable. Thus, a need exists for a composition that is suitable for use both as a seasoning and as a non-sticking base.

In addition, a need exists for a composition that is suitable for use as a seasoning and non-stick base for grilled food items which is easily prepared.

For the foregoing reasons, a need exists for a composition of matter suitable for use as a seasoning and non-stick base that is easily prepared. The present invention substantially overcomes these and other prior art problems.

SUMMARY OF THE PRESENT INVENTION

The preferred embodiment of the composition of the present invention solves the aforementioned problems in a straightforward and simple manner. An object of the present invention is to provide a composition that is suitable for use both as a seasoning and as a non-stick base for cooking food items on a grill.

Another object of the present invention is to provide a composition that is suitable for use as a seasoning and as a non-stick base on grilled food items which is easily prepared.

The present invention is directed to a composition suitable for use as a seasoning and non-stick base for cooking food items on a grill. The composition includes an egg-based composition containing egg yolk, distilled vinegar and soybean oil; a lemon juice containing water, lemon juice concentrate, lemon oil, and preservatives; a tomato paste containing tomatoes, salt and citric acid; a salt-based composition containing salt, yellow dyes #5 and 6, imitation butter flavor and preservatives; white vinegar; water; flavorings; a mustard-based composition containing black mustard seeds, vinegar, white wine, salt and spices; paprika; and sugar.

In a preferred embodiment of the present invention the flavorings include black pepper, cayenne pepper, granulated garlic and basil. In a more preferred embodiment of the present invention, the above-listed ingredients are mixed to form 6 gallon batches of the composition in the following proportions: 4 gallons by volume of the egg-based composition; 48 ounces by volume of lemon juice; 42 ounces by weight of tomato paste; 35 ounces by weight of the salt-based composition; 3 cups by volume of white vinegar; 3 cups by volume of water; 12¾ ounces by weight of black pepper; 3¼ ounces by weight of cayenne pepper; 7¼ ounces by weight of granulated garlic; ½ ounce by weight of basil; 20 ounces by weight of the mustard-based composition; 11 ounces by weight of paprika; and 8 ounces by weight of sugar.

In the most preferred embodiment of the present invention, the egg-based composition contains 20% by volume egg yolk, 10% by volume distilled vinegar and 70% by volume soybean oil; the salt-based composition contains 70% by volume superfine ground salt, 25% by volume imitation powdered butter flavoring, 3% by volume yellow dye #5 and 2% by volume yellow dye #6; the mustard-based composition contains 70% by volume black mustard seeds ground, 18% by volume white vinegar and 12% by volume white Chablis wine; and the tomato paste contains 92% by volume vine ripened tomatoes, 5% by volume salt and 3% by volume citric acid, such that the tomatoes are pureed and cooked with the salt and citric acid until 90% by volume of all the water in the tomatoes has evaporated.

The present invention also encompasses a method for making the composition suitable for use as a seasoning and non-stick base. The above-listed ingredients for the composition are blended thoroughly in a food mixer at ambient temperature. The blending process requires no special time or cooking requirements. Thus, the composition of the present invention is easily prepared.

These and other features, aspects, and advantages of the present invention will become better understood with regard to the following description and appended claims.

DETAILED DESCRIPTION OF THE PREFERRED EMBODIMENT

The present invention comprises a composition suitable for use as a seasoning and non-stick base for food items cooked on a grill. The composition is prepared by blending an egg-based composition containing egg yolk, distilled vinegar and soybean oil; a lemon juice containing water, lemon juice concentrate, lemon oil and preservatives; a tomato paste containing tomatoes, salt and citric acid; a salt-based composition containing salt, yellow dyes #5 and 6, imitation butter flavor and preservatives; white vinegar; water; flavorings; a mustard-based composition containing black mustard seeds, vinegar, white wine, salt and spices; paprika; and sugar, in a food mixer. The above-listed ingredients are blended in no particular order. The ingredients are blended only for the period of time necessary to thoroughly blend all of the ingredients. The blending process takes place at ambient temperature, with no special time or cooking requirements. Added air through high speed blending is not desirable.

In a more preferred embodiment of the present invention, the composition is prepared in 6 gallon batches by mixing the above-listed ingredients in the following proportions: 4 gallons by volume of the egg-based composition; 48 ounces by volume of lemon juice; 42 ounces by weight of tomato paste; 35 ounces by weight of the salt-based composition; 3 cups by volume of white vinegar; 3 cups by volume of water; 12¾ ounces by weight of black pepper; 3¼ ounces by weight of cayenne pepper; 7¼ ounces by weight of granulated garlic; ½ ounce by weight of basil; 20 ounces by weight of the mustard-based composition; 11 ounces by weight of paprika; and 8 ounces by weight of sugar.

In the most preferred embodiment of the present invention, the egg-based composition contains 20% by volume egg yolk, 10% by volume distilled vinegar and 70% by volume soybean oil; the salt-based composition contains 70% by volume superfine ground salt, 25% by volume imitation powdered butter flavoring, 3% by volume yellow dye #5 and 2% by volume yellow dye #6; the mustard-based composition contains 70% by volume black mustard seeds ground, 18% by volume white vinegar and 12% by volume white Chablis wine; and the tomato paste contains 92% by volume vine ripened tomatoes, 5% by volume salt and 3% by volume citric acid, such that the tomatoes are pureed and cooked with the salt and citric acid until 90% by volume of all of the water in the tomatoes has evaporated.

The composition is applied to food items prior to placing the food items on the grill for cooking. The composition of the present invention can also be used as a marinating sauce on grilled food items.

The egg-based composition is commonly known as mayonnaise. The mustard-based composition is also known as Dijon mustard. The salt-based composition is also known as popcorn salt.

Preservatives are not necessary if the composition of the present invention is made from scratch. Furthermore, the lemon juice can simply be juice squeezed from fresh lemons.

The present invention also encompasses a method for making the composition of the present invention. The above-listed ingredients are blended together in a food mixer at ambient temperature until all of the ingredients are thoroughly blended.

While specific embodiments of the present invention have been shown and described in detail to illustrate the application of the principles of the present invention, it will be understood that the present invention may be embodied otherwise without departing from these principles. Therefore, the spirit and scope of the appended claims should not be limited to the description of the preferred embodiments contained herein.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A composition suitable for use as a seasoning and non-stick base for preparing food items for cooking on a grill, comprising:
   (a) approximately 67% by volume of an egg-based composition comprising: egg yolk, distilled vinegar and soybean oil, whereby said items are prevented from sticking to said grill during cooking;
   (b) approximately 6% by volume of a lemon juice comprising: water, lemon juice concentrate, lemon oil and preservatives;
   (c) approximately 5% by weight of a tomato paste comprising: tomatoes, salt and citric acid;
   (d) approximately 5% by weight of a salt-based composition comprising: salt, yellow dye and imitation butter flavoring;
   (e) approximately 3% by volume of white vinegar;
   (f) approximately 3% by volume of water;
   (g) flavorings comprising:
      i. approximately 2% by weight of black pepper;
      ii. approximately 0.5% by weight of cayenne pepper;
      iii. approximately 1% by weight of granulated garlic; and,
      iv. approximately 0.5% by weight of basil;
   (h) approximately 3% by weight of a mustard-based composition comprising: black mustard seeds, vinegar, white wine, salt and spices;
   (i) approximately 2% by weight of paprika; and,
   (j) approximately 1% by weight of sugar.

2. The composition of claim 1, wherein
   (a) said egg-based composition comprises essentially 20% by volume egg yolk, 10% by volume distilled vinegar and 70% by volume soybean oil;
   (b) said salt-based composition comprises essentially 70% by volume superfine ground salt, 25% by volume imitation powdered butter flavoring, 5% by volume yellow dye;
   (c) said mustard-based composition comprises 70% by volume black mustard seeds ground, 18% by volume white vinegar and 12% by volume white wine; and
   (d) said tomato paste comprises 92% by volume tomatoes, 5% by volume salt and 3% by volume citric acid.

3. The composition of claim 2, wherein said yellow dye of said salt-based composition is a mixture of yellow dye #5 and yellow dye #6 comprising 3% by volume yellow dye #5 and 2% by volume yellow dye #6.

4. The composition of claim 1, wherein said salt-based composition further comprises preservatives.

5. A composition suitable for use as a seasoning and non-stick base for preparing food items for cooking on a grill, comprising:
   (a) approximately 66.7% by volume of an egg-based composition comprising: egg yolk, distilled vinegar and soybean oil, whereby said items are prevented from sticking to said grill during cooking;
   (b) approximately 6.3% by volume of a lemon juice comprising: water, lemon juice concentrate, lemon oil and preservatives;
   (c) approximately 5.5% by weight of a tomato paste comprising: tomatoes pureed and cooked with salt and citric acid until 90% by volume of all of the water in the tomatoes has evaporated;
   (d) approximately 4.6% by weight of a salt-based composition comprising: salt, yellow dye and imitation butter flavoring;
   (e) approximately 3.1% by volume of white vinegar;
   (f) approximately 3.1% by volume of water;
   (g) flavorings comprising:
      i. approximately 1.7% by weight of black pepper;
      ii. approximately 0.4% by weight of cayenne pepper;
      iii. approximately 1% by weight of granulated garlic; and,
      iv. approximately 0.7% by weight of basil;
   (h) approximately 2.6% by weight of a mustard-based composition comprising: black mustard seeds, vinegar, white wine, salt and spices;
   (i) approximately 1.4% by weight of paprika; and,
   (j) approximately 1% by weight of sugar.

6. The composition of claim 5, wherein
(a) said egg-based composition comprises essentially 20% by volume egg yolk, 10% by volume distilled vinegar and 70% by volume soybean oil;
(b) said salt-based composition comprises essentially 70% by volume superfine ground salt, 25% by volume imitation powdered butter flavoring, 3% by volume yellow dye;
(c) said mustard-based composition comprises 70% by volume black mustard seeds ground, 18% by volume white vinegar and 12% by volume white wine; and
(d) said tomato paste comprises 92% by volume tomatoes, 5% by volume salt and 3% by volume citric acid.

7. The composition of claim 6, wherein said yellow dye of said salt-based composition is yellow dye #5 and yellow dye #6.

8. The composition of claim 5, wherein said salt-based composition further comprises preservatives.

9. A method of making the composition of claim 2, comprising: blending at ambient temperature said egg-based composition, said lemon juice, said tomato paste, said salt-based composition, said white vinegar, said water, said black pepper, said cayenne pepper, said granulated garlic, said basil, said mustard-based composition, said paprika and said sugar in a means for blending until thoroughly blended.

* * * * *